US006279834B1

(12) United States Patent
Fox et al.

(10) Patent No.: US 6,279,834 B1
(45) Date of Patent: Aug. 28, 2001

(54) COMPRESSED GAS PROPELLED AEROSOL DEVICES

(75) Inventors: Rodney Thomas Fox, Hull; Neale Mark Harrison, Burton-on-Trent; John Farrell Hughes, Southampton; Lindsey Faye Whitmore, Winchester, all of (GB)

(73) Assignee: Reckitt & Colman Products Limited, Windsor (GB)

( * ) Notice: Subject to any disclaimer, the term of this patent is extended or adjusted under 35 U.S.C. 154(b) by 0 days.

(21) Appl. No.: 09/530,150

(22) PCT Filed: Oct. 23, 1998

(86) PCT No.: PCT/GB98/03180

§ 371 Date: Jun. 28, 2000

§ 102(e) Date: Jun. 28, 2000

(87) PCT Pub. No.: WO99/21659

PCT Pub. Date: May 6, 1999

(30) Foreign Application Priority Data

Oct. 28, 1997 (GB) .................................................. 9722611
Jul. 2, 1998 (GB) .................................................. 9814369

(51) Int. Cl.[7] ..................................................... A01G 23/10

(52) U.S. Cl. .............................. 239/3; 239/337; 239/493; 239/690; 239/708

(58) Field of Search .................................. 239/3, 8, 690, 239/708, 337, 491, 493

(56) References Cited

U.S. PATENT DOCUMENTS 4,776,515 * 10/1988 Michalchik .......................... 239/706
4,971,257 * 11/1990 Birge .................................... 239/708
5,211,317 * 5/1993 Diamond .
5,400,975 * 3/1995 Inculet et al. .
5,490,633 * 2/1996 Feffries et al. ....................... 239/691
5,810,265 * 9/1998 Cornelius et al. .................. 239/690
6,199,755 * 3/2001 Fox et al. ................................ 239/3

FOREIGN PATENT DOCUMENTS

WO-94/19042 * 9/1994 (WO) .
WO-97/28883 * 8/1997 (WO) .

* cited by examiner

*Primary Examiner*—Lesley D. Morris
(74) *Attorney, Agent, or Firm*—Fish & Richardson P.C.

(57) ABSTRACT

A method of reducing the droplet sizes of a composition sprayed from an aerosol spray device comprising a compressed gas propellant, which method comprises imparting a unipolar charge to the liquid droplets by double layer charging during the spraying of the liquid droplets from the aerosol spray device, the unipolar charge being at a level such that the said droplets have a charge to mass ratio of at least +/−$1\times10^{-4}$ C/kg.

13 Claims, 4 Drawing Sheets

FIG. 6. COMPRESSED GAS AEROSOLS
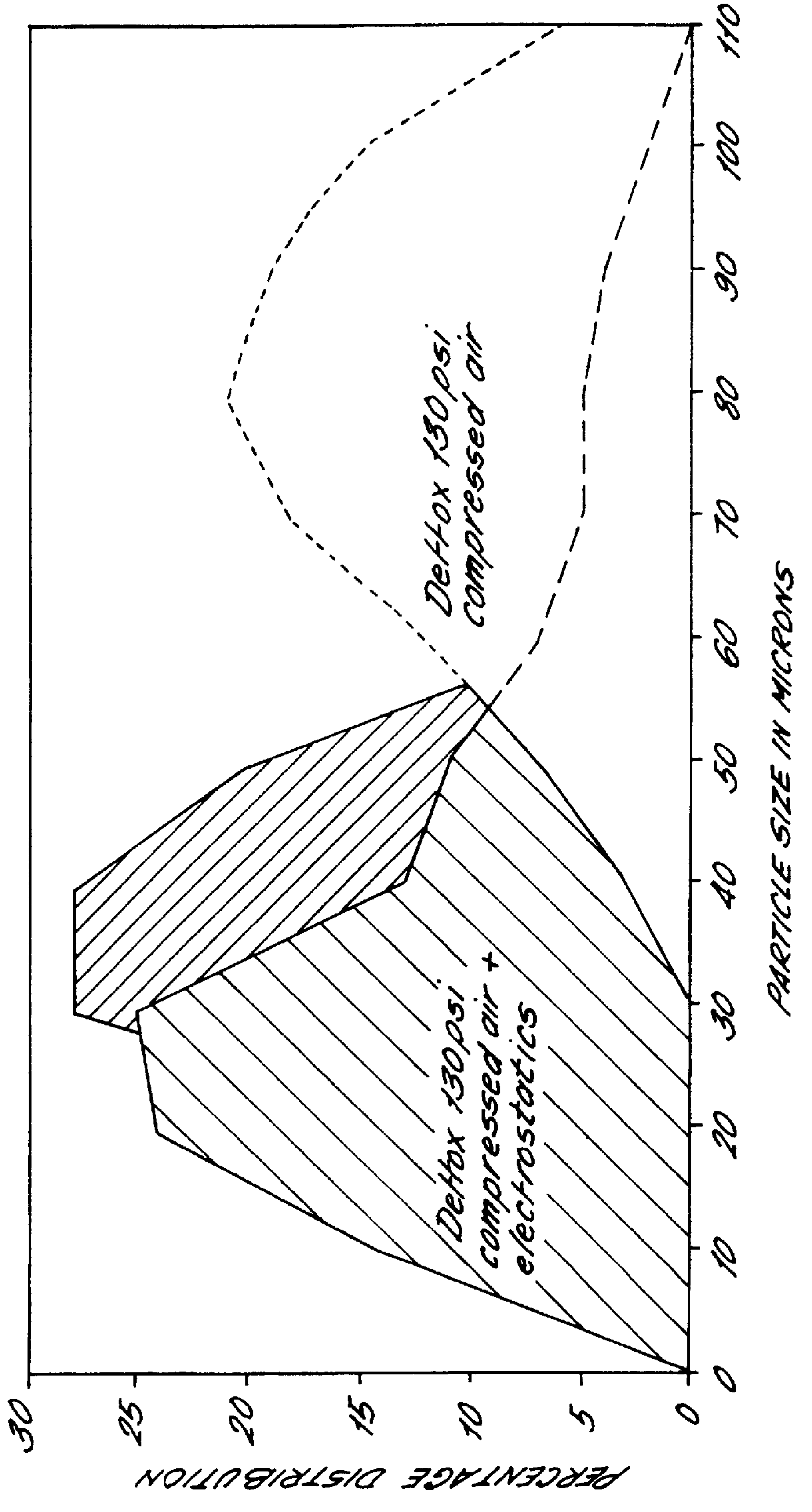

COMPRESSED GAS PROPELLED AEROSOL DEVICES

BACKGROUND OF THE INVENTION

The present invention relates to method of reducing the droplet size in aerosol spray devices which use a compressed gas propellant, and to an apparatus therefor.

An aerosol spray device incorporating a liquefied propellant, such as liquid butane produces an aerosol in which the liquid droplets are of relatively small size. For example, various known products which are produced as an aerosol spray using a liquefied propellant such as liquid butane (typically at 40 psi) having a diameter in the range of from 10 to 60 micrometers, with a peak distribution at around 30 to 40 micrometers. In comparison, if the liquid butane in such products is replaced by compressed gas at a pressure of 130 psi, the diameter range of the liquid droplets in the resultant aerosol spray is generally in the range of from 30 to 110 micrometers, with a peak distribution in the range of from 70 to 90 micrometers.

In aerosol spray devices which contain a liquefied propellant, such as butane the activation of the aerosol device causes the butane to evaporate instantly. As a result there are two mechanisms for the breaking up of the liquid while it is being expelled from the aerosol device. The first mechanism is the application of mechanical forces which act on the liquid as it is forced out of the body of the aerosol spray device through the spray head and into the atmosphere. The second mechanism is the evaporation of the liquid propellant, which itself causes or assists in the break-up of the liquid. The net effect is that the spray emerging from such an aerosol device contains liquid droplets of a relatively small size, as discussed above.

In contrast aerosol spray devices which use compressed air as the propellant rely entirely on the mechanical forces acting upon the liquid as it is sprayed from the aerosol device in order to break it up into droplets. Accordingly, the droplets are of relatively large diameter as compared to the size of the droplets from an aerosol spray device with a liquid propellant.

The relatively large droplet sizes produced by aerosol spray devices using a compressed gas propellant means that these aerosol spray devices are not suitable for some applications and aerosol spray devices incorporated liquefied propellants must be used. This is because the large droplet sizes produced by such aerosol spray devices are too wet and give a relatively poor dispersion of the product being sprayed.

We have now developed a method of reducing the droplet size of droplets sprayed from aerosol spray devices using a compressed gas propellant.

SUMMARY OF THE INVENTION

According to the present invention there is provided a method of reducing the droplet size of a product sprayed from an aerosol spray device comprising a compressed gas propellant, which method comprises imparting a unipolar charge to the liquid droplets by double layer charging during the spraying of the liquid droplets from the aerosol spray device, the unipolar charge being at a level such that the said droplets have a charge to mass ratio of at least $+/-1\times10^{-4}$ C/kg.

It is preferred that the unipolar charge which is imparted to the liquid droplets is generated solely by the interaction between the liquid within the aerosol spray device and the spray device itself as the liquid is sprayed therefrom. In particular, it is preferred that the manner in which a unipolar charge is imparted to the liquid droplets does not rely even partly upon the connection of the aerosol spray device to any external charge inducing device, such as a source of relatively high voltage. With such an arrangement, the aerosol spray device is entirely self-contained making it suitable for use both in industrial, institutional and domestic situations. Preferably, therefore the charge to mass ratio of at least $+/-1\times10^{-4}$ C/kg is imparted to the liquid droplets as a result of the use of an aerosol spray device with at least one of the features of the material of the actuator, the size and shape of the orifice of the actuator, the diameter of the dip tube, the characteristics of the valve and the formulation of the composition contained within the aerosol spray device being chosen in order to achieve the said droplet charge to mass ratio by double layer charging imparting the unipolar charge to the droplets during the actual spraying of the liquid droplets from the orifice of the aerosol spray device.

The liquid droplets sprayed by the method of the present invention generally have a diameter range of from 3 to 110 micrometers, with a proportion of the droplets having a diameter in the range of from 10 to 50 micrometers, with a peak diameter range of from 20 to 40 micrometers.

Preferably, the aerosol spray device is a domestic aerosol spray device in the form of a hand-held aerosol can.

The present invention includes within its scope apparatus for spraying a liquid composition capable of forming charged droplets, the apparatus comprising:

(1) a reservoir for accommodating the liquid composition;

(2) a liquid composition contained within the reservoir and including a compressed gas propellant;

(3) a spray head for expelling the composition in the form of a spray of droplets; and (4) a conduit system for feeding the composition from the reservoir to the spray head, wherein the composition is formulated and the apparatus is constructed in order to achieve a charge to mass ratio of at least $+/-1\times10^{-4}$ C/kg by double layer charging imparting a unipolar charge to the droplets during the spraying of the droplets from the aerosol spray device.

DETAILED DISCLOSURE OF THE INVENTION

The charge to mass ratio stated above implies a considerable increase in charge imparted to the droplets, compared with the position with known aerosol spray devices. For example, the charge imparted to the droplets of liquids sprayed from standard aerosol spray devices, which use liquefied propellants, provides a charge to mass ratio only of the order of $+/-1\times10^{-8}$ to $1\times10^{-5}$ C/kg. Aerosol spray devices with liquefied propellants would be expected to give higher charge to mass ratios than would be obtained with a "conventional", compressed gas propellant aerosol spray device. Typically, compressed gas driven aerosol products will have a charge to mass ratio of $+/-5\times10^{-8}$ to $1\times10^{-6}$ C/Kg.

The unipolar charge which is imparted to the droplets during spraying has two effects. Since all of the droplets have the same polarity charge, they are repelled from one another. Accordingly, there is little or no coalescence of the droplets and, in contrast, they tend to spread out to a great extent as compared to uncharged droplets. In addition, if the repulsive forces from the charge within the droplets is greater than the surface tension force of the droplets, the droplets are caused to fragment into a plurality of smaller droplets (exceeding the Rayleigh limit). This process continues until either the two opposing forces are equalised or the droplet has evaporated.

By means of the present invention, aerosol spray devices may be produced making use of compressed gas propellant which give considerably reduced droplet diameters and therefore allow the aerosol spray devices to be used in applications previously not available for such compressed gas propelled devices.

For example, compressed gas propellants may be used for antiperspirants, hair sprays, insecticides, horticultural products, air fresheners, waxes and polishes, oven cleaners, starches and fabric finishes, shoe and leather care products, glass cleaners and various other household, institutional, professional and industrial products.

In general the liquid composition which is sprayed into the air using the aerosol spray device is a water and hydrocarbon mixture, or emulsion, or a liquid which is converted into an emulsion by shaking the spraying device before use, or during the spraying process.

Whilst all liquid aerosols are known to carry a net negative or positive charge as a result of double layer charging, or the fragmentation of liquid droplets, the charge imparted to droplets of liquid sprayed from standard devices is only of the order of $+/-1\times10^{-8}$ to $1\times10^{-5}$ C/kg.

The invention relies on combining various characteristics of an aerosol spray device so as to increase the charging of the liquid as it is sprayed from the aerosol spray device.

A typical compressed gas aerosol spray device comprises:

1. An aerosol can containing the composition to be sprayed from the device and a compressed gas propellant;
2. A dip tube extending into the can, the upper end of the dip tube being connected to a valve;
3. An actuator situated above the valve, which is capable of being depressed in order to operate the valve; and
4. An insert provided in the actuator comprising an orifice from which the composition is sprayed.

A preferred aerosol spray device for use in the present invention is described in GB 9722611.2 filed on Oct. 28, 1997.

It is possible to impart higher charges to the liquid droplets by choosing aspects of the aerosol device including the material, shape and dimensions of the actuator, the actuator insert, the valve and the dip tube and the characteristics of the liquid which is to be sprayed, so that the required level of charge is generated as the liquid is dispersed as droplets.

A number of characteristics of the aerosol system increase double layer charging and charge exchange between the liquid formulation and the surfaces of the aerosol system. Such increases are brought about by factors which may increase the turbulence of the flow through the system, and increase the frequency and velocity of contact between the liquid and the internal surface of the container and valve and actuator system.

By way of example, characteristics of the actuator can be optimised to increase the charge levels on the liquid sprayed from the container. A smaller orifice in the actuator insert, of a size of 0.45 mm or less, increase the charge levels of the liquid sprayed through the actuator. The choice of material for the actuator can also increase the charge levels on the liquid sprayed from the device with material such as nylon, polyester, acetal, PVC and polypropylene tending to increase the charge levels. The geometry of the orifice in the insert can be optimised to increase the charge levels on the liquid as it is sprayed through the actuator. Inserts which promote the mechanical break-up of the liquid give better charging.

The actuator insert of the spray device may be formed from a conducting, insulating, semi-conducting or static-dissipative material.

The characteristics of the dip tube can be optimised to increase the charge levels in the liquid sprayed from the container. A narrow dip tube, of for example about 1.27 mm internal diameter, increases the charge levels on the liquid, and the dip tube material can also be changed to increase charge.

Valve characteristics can be selected which increase the charge to mass ratio of the liquid product as it is sprayed from the container. A small tailpiece orifice in the housing, of about 0.65 mm, increases product charge to mass ratio during spraying. A reduced number of holes in the stem, for example 2×0.50 mm, also increases product charge during spray.

Changes in the product formulation can also affect charging levels. A formulation containing a mixture of hydrocarbon and water, or an emulsion of an immiscible hydrocarbon and water, will carry a higher charge to mass ratio when sprayed from the aerosol device than either a water alone or hydrocarbon alone formulation.

It is preferred that a composition of use in the present invention comprises an oil phase, an aqueous phase, a surfactant and a compressed gas propellant.

Preferably the oil phase includes a $C_9$–$C_{12}$ hydrocarbon, which is preferably present in the composition in an amount of from 2 to 10% w/w.

Preferably the surfactant is glyceryl oleate or a polyglycerol oleate, which is preferably present in the composition in an amount of from 0.1 to 1.0% w/w.

The liquid droplets sprayed from the aerosol spray device will generally have diameters in the range of from 3 to 110 micrometers, preferably a proportion of the droplets have a diameter in the range of from 10 to 50 micrometers with a peak of droplets of about 40 micrometers. The liquid which is sprayed from the aerosol spray device may contain a predetermined amount of a particulate material, for example, fumed silica, or a predetermined amount of a volatile solid material, such as menthol or naphthalene.

A can for an aerosol spray device according to the invention is formed of aluminium, or lacquered or unlacquered tin plate, or the like. The actuator insert of such an aerosol device may be formed of, for example, acetal resin. The valve stem lateral opening of such a device may preferably be in the form of two apertures of,diameters 0.51 mm.

BRIEF DESCRIPTION OF THE DRAWINGS

The present invention will now be described, by way of example only, with reference to the accompanying drawings in which:

FIG. 6 illustrates the results showing the efficacy of the present invention.

DETAILED DISCUSSION OF THE DRAWINGS

Figure 1:
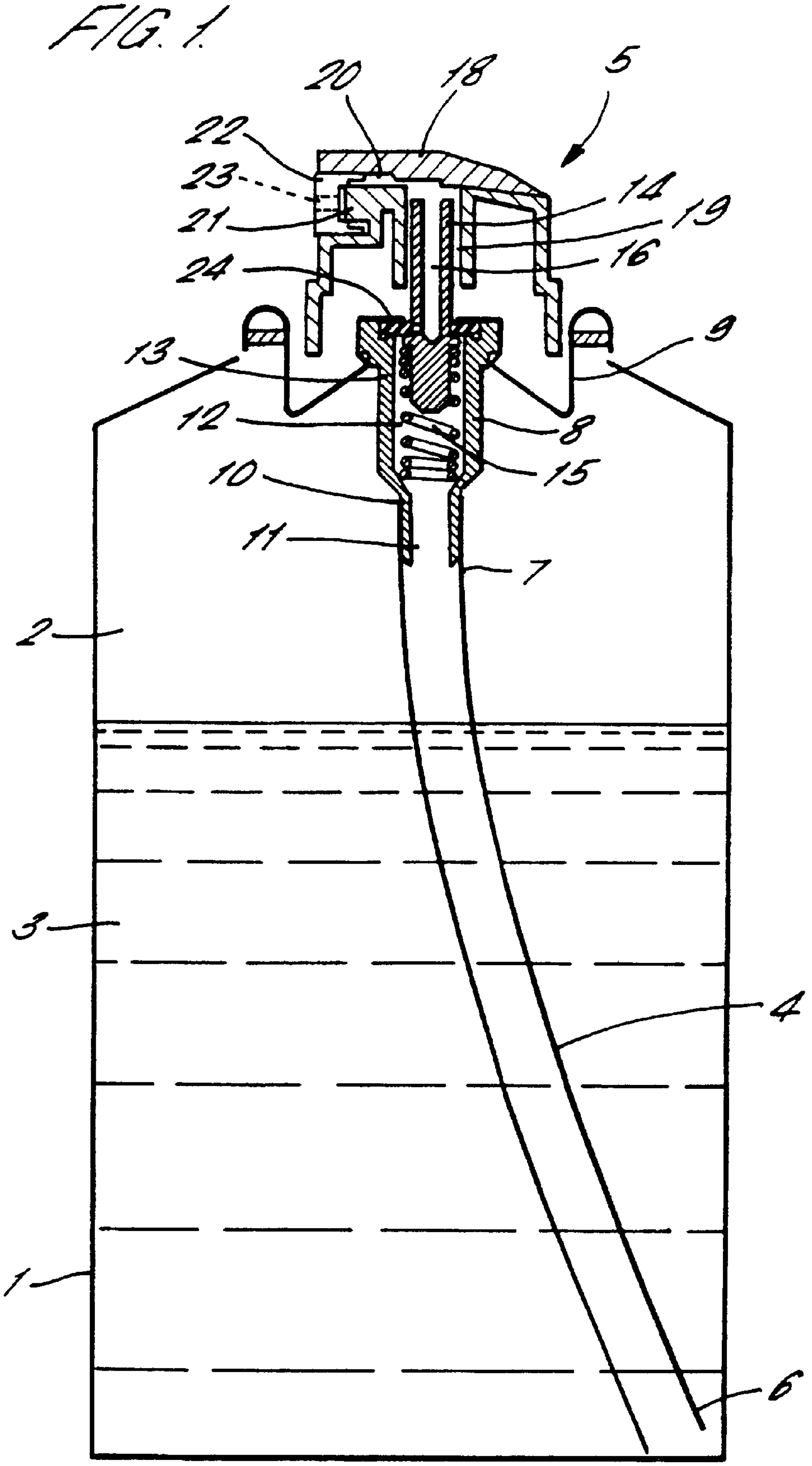
FIG. 1 is a diagrammatic cross section through an aerosol spraying apparatus in accordance with the invention.
Figure 2:
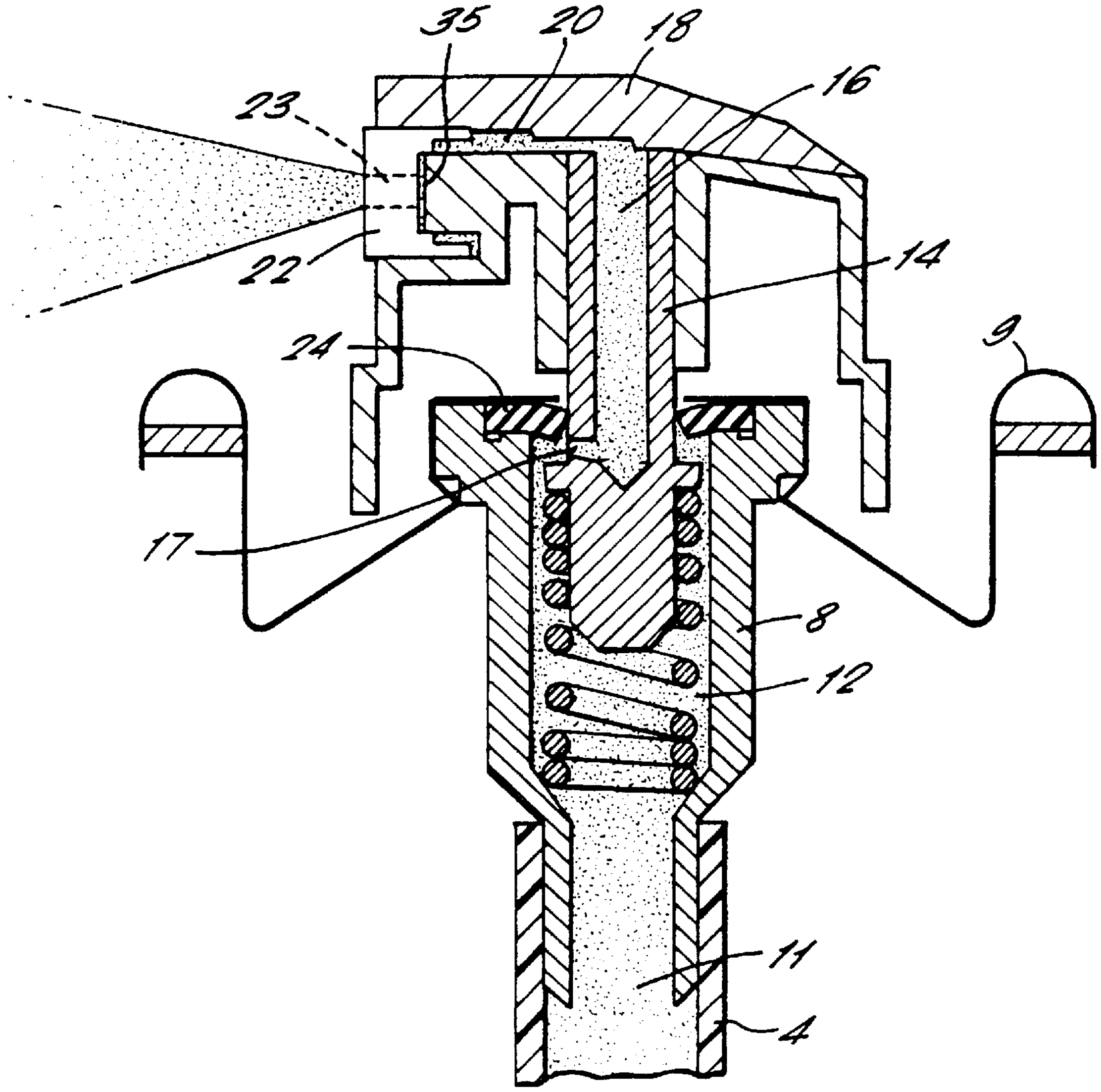
FIG. 2 is a diagrammatic cross section through the valve assembly of the apparatus of FIG. 1.

Referring to FIGS. 1 and 2, an aerosol spray device in accordance with the invention is shown. It comprises a can 1, formed of aluminium or lacquered or unlacquered tin plate or the like in conventional manner, defining a reservoir 2 for a liquid 3 having a conductivity such that droplets of the liquid can carry an appropriate electrostatic charge. Also located in the can is a gas under pressure which is capable of forcing the liquid 3 out of the can 1 via a conduit system comprising a dip tube 4 and a valve and actuator assembly 5. The dip tube 4 includes one end 6 which terminates at a bottom peripheral part of the can 1 and another end 7 which is connected to a tailpiece 8 of the valve assembly. The tailpiece 8 is secured by a mounting assembly 9 fitted in an opening in the top of the can and includes a lower portion 10 defining a tailpiece orifice 11 to which end 7 of the dip tube 4 is connected. The tailpiece includes a bore 12 of relatively narrow diameter at lower portion 11 and a relatively wider diameter at its upper portion 13. The valve assembly also includes a stem pipe 14 mounted within the bore 12 of the tailpiece and arranged to be axially displaced within the bore 12 against the action of spring 15. The valve stem 14 includes an internal bore 16 having one or more lateral openings (stem holes) 17 (see FIG. 2). The valve assembly includes an actuator 18 having a central bore 19 which accommodates the valve stem 14 such that the bore 16 of the stem pipe 14 is in communication with bore 19 of the actuator. A passage 20 in the actuator extending perpendicularly to the bore 19 links the bore 19 with a recess including a post 21 on which is mounted a spraying head in the form of an insert 22 including a bore 23 which is in communication with the passage 20.

A ring 24 of elastomeric material is provided between the outer surface of the valve stem 14 and, ordinarily, this sealing ring closes the lateral opening 17 in the valve stem 14. The construction of the valve assembly is such that when the actuator 18 is manually depressed, it urges the valve stem 14 downwards against the action of the spring 15 as shown in FIG. 2 so that the sealing ring 24 no longer closes the lateral opening 17. In this position, a path is provided from the reservoir 2 to the bore 23 of the spraying head so that liquid can be forced, under the pressure of the gas in the can, to the spraying head via a conduit system comprising the dip tube 4, the tailpiece bore 12, the valve stem bore 16, the actuator bore 19 and the passage 20.

Preferably the lateral opening 17 linking the valve stem bore 16 to the tailpiece bore 12 is in the form of two orifices each having a diameter of not less than 0.51 mm to enhance electrostatic charge generation. Further, the diameter of the dip tube 4 is preferably as small as possible, for example, 1.2 mm, in order to increase the charge imparted to the liquid. Also, charge generation is enhanced if the diameter of the tailpiece orifice 11 is as small as possible eg not more than about 0.64 mm.

Figure 3:
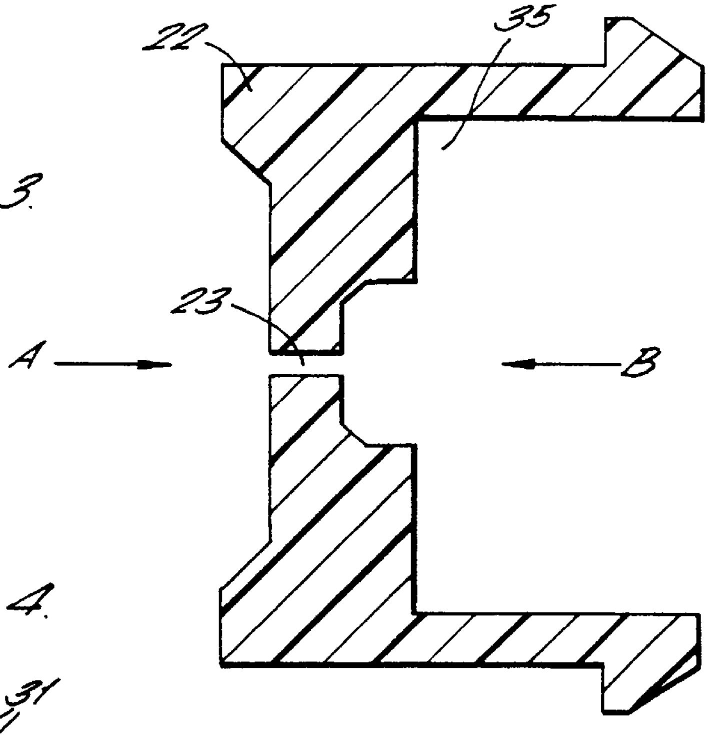
FIG. 3 is a cross section through the actuator insert of the assembly shown in FIG. 2.
Figure 4:
FIG. 4 shows the configuration of the bore of the spraying head shown in FIG. 3 when viewed in the direction A.

Referring now to FIG. 3, there is shown on an increased scale, a cross section through the actuator insert of the apparatus of FIGS. 1 and 2. For simplicity, the bore 23. is shown as a single cylindrical aperture in this Figure. However, the bore 23 preferably has the configuration, for instance, shown in FIG. 4. The apertures of the bore 23 are denoted by reference numeral 31 and the aperture-defining portions of the bore are denoted by reference numeral 30. The total peripheral length of the aperture-defining portions at the bore outlet is denoted by L (in mm) and a is the total area of the aperture at the bore outlet (in $mm^2$) and the values for L and a are as indicated in FIG. 4. L/a exceeds 8 and this condition has been found to be particularly conductive to charge development because it signifies an increased contact area between the actuator insert and the liquid passing there through.

Many different configurations can be adopted in order to produce a high L/a ratio without the cross-sectional area a being reduced to a value which would allow only low liquid flow rates. Thus, for example it is possible to use actuator insert bore configurations (i) wherein the bore outlet comprises a plurality of segment-like apertures (with or without a central aperture); (ii) wherein the outlet comprises a plurality of sector-like apertures; (iii) wherein the aperture together form an outlet in the form of a grill or grid; (iv) wherein the outlet is generally cruciform; (v) wherein the apertures together define an outlet in the form of concentric rings; and combinations of these configurations. Particularly preferred are actuator insert bore configurations wherein a tongue like portion protrudes into the liquid flow stream and can be vibrated thereby. This vibrational property may cause turbulent flow and enhanced electrostatic charge separation of the double layer, allowing more charge to move into the bulk of the liquid.

Figure 5:
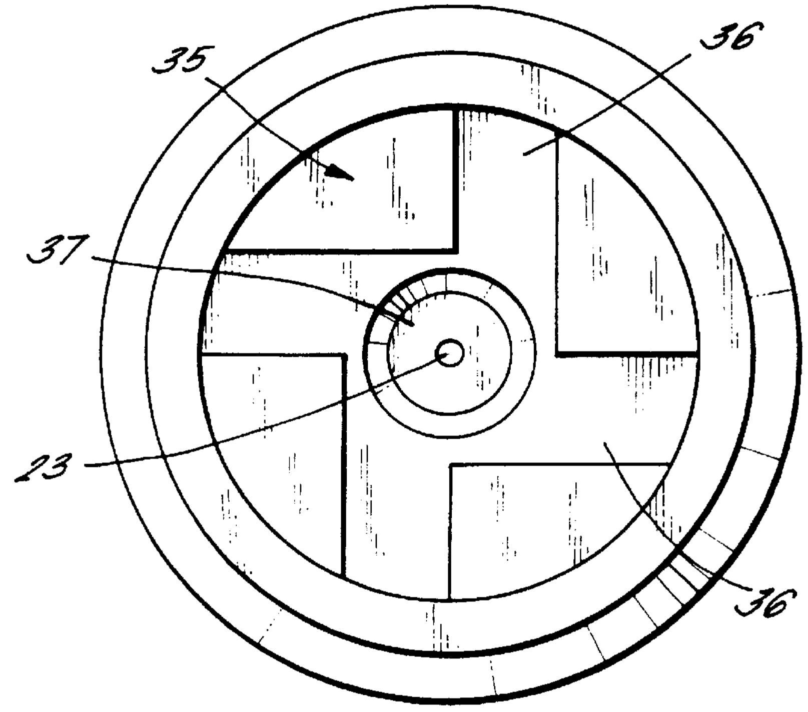
FIG. 5 shows the configuration of the swirl chamber of the spraying head shown in FIG. 3 when viewed in the direction B.

Referring now to FIG. 5, there is shown a plan view of one possible configuration of swirl chamber 35 of the actuator insert 22. The swirl chamber includes four lateral channels 36 equally spaced and tangential to a central area 37 surrounding the bore 23. In use, the liquid driven from the reservoir 2 by the gas under pressure travels along passage 20 and strikes the channels 36 normal to the longitudinal axis of the channels. The arrangement of the channels is such that the liquid tends to follow a circular motion prior to entering the central area 37 and thence the bore 23. As a consequence, the liquid is subjected to substantial turbulence which enhances the electrostatic charge in the liquid.

The present invention will now be described, by way of example, with reference to FIG. 6 of the accompanying drawings which shows particle size distribution for aerosol sprays produced using different aerosol compositions.

EXAMPLE

The aerosol compositions used in this example were based on the Dettox Antibacterial Room Spray manufactured by Reckitt and Colman Products Limited. Three aerosols spray systems were compared, as follows:

(A) Dettox with liquid butane gas propellant in a standard aerosol can.

(B) Dettox with 130 psi compressed air propellant in a standard aerosol can.

(C) Dettox with 130 psi compressed air propellant in a standard aerosol can. The charge level on the droplets emitted from this spray can was artificially raised to a charge to mass ratio of approximately $-1\times10^{-4}$ C/kg by supplying −10 kv charge to the seam of the can from a high voltage power supply.

The particle sizes of the liquid sprays emitted by the aerosol spray devices were measured using a Malvern particle size analyser located 50 cm from the aerosol can.

The resultant particle size distributions as measured are shown in FIG. 6. It can be seen that the standard aerosol spray device using a liquefied butane propellant produces a particle diameter distribution which ranges from about 10 to 60 micrometers, with a peak at between 30 and 40 micrometers. The particle diameter distribution for the standard system using a compressed air propellant gives rise to a particle diameter range of from about 30 to 100 micrometers with a peak at between 70 and 90 micrometers. In contrast, the use of a system involving a compressed air propellant and a device imparting a higher unipolar charge to the liquid droplets gives rise to a particle diameter distribution ranging from 3 to 110 micrometers, with the bulk of the particles having a diameter range of from about 10 to 50 micrometers and with a peak range of from 20 to 30 micrometers.

It is found that, when using a compressed air propellant, by imparting a relatively high charge to the liquid droplets, an aerosol spray device may be used in all known aerosol applications whereas previously known, compressed air devices were excluded for some applications due to the relatively large droplet sizes giving rise to an aerosol spray which was perceived as too wet and had too poor a dispersion.

What is claimed is:

1. A method of reducing the droplet size of a composition sprayed from an aerosol spray device comprising a compressed gas propellant, which method comprises imparting a unipolar charge to the liquid droplets by double layer charging during the spraying of the liquid droplets from the aerosol spray device, the unipolar charge being at a level such that the said droplets have a charge to mass ratio of at least +/−1×10$^{-4}$ C/kg.

2. A method as claimed in claim 1 wherein the aerosol spray device is a domestic aerosol spray device.

3. A method as claimed in claim 1 wherein the product contained in the aerosol spray device is an emulsion.

4. A method as claimed in claim 1 wherein the liquid droplets have a diameter in the range of from 3 to 110 micrometers with a proportion of the droplets having a diameter in the range of from 10 to 50 micrometers.

5. A method as claimed in claim 4 wherein the droplets have a peak diameter range of from 20 to 40 micrometers.

6. A method as claimed in claim 1 wherein the aerosol spray device comprises: an aerosol can containing the composition to be sprayed; a dip tube extending into the can; a valve connected to the dip tube; and an actuator situated above the valve and having an orifice through which the composition is sprayed.

7. A method as claimed in claim 6 wherein the required charge to mass ratio is achieved by employing a spray device in which one or more features are chosen so as to achieve said charge to mass ratio during actual spraying of the liquid droplets from the orifice, said features selected from the group consisting of the material from which the actuator is constructed, the size and/or shape of the orifice, the diameter of the dip tube, the characteristics of the valve and the formulation of the composition to be sprayed.

8. A method as claimed in claim 6 wherein the aerosol spray device contains a composition comprising an oil phase, an aqueous phase, a surfactant and a compressed gas propellant.

9. A method as claimed in claim 8 wherein the oil phase includes a $C_9$–$C_{12}$ hydrocarbon.

10. A method as claimed in claim 9 wherein the $C_9$–$C_{12}$ hydrocarbon is present in the composition in an amount of form 2 to 10% w/w.

11. A method as claimed in claim 8 wherein the surfactant is glyceryl oleate or a polyglycerol oleate.

12. A method as claimed in claim 8 wherein the surfactant is present in the composition in an amount of from 0.1 to 1.0% w/w.

13. Apparatus for spraying a liquid composition capable of forming charged droplets, the apparatus comprising:

(1) a reservoir for accommodating the liquid composition;

(2) a liquid composition contained within the reservoir and including a compressed gas propellant;

(3) a spray head for expelling the composition in the form of a spray of droplets; and (4) a conduit system for feeding the composition from the reservoir to the spray head, wherein the composition is formulated and the apparatus is constructed in order to achieve a charge to mass ratio of at least +/−1×10$^{-4}$ C/kg by double layer charging imparting a unipolar charge to the droplets during the spraying of the droplets from the aerosol spray device.

* * * * *

UNITED STATES PATENT AND TRADEMARK OFFICE

CERTIFICATE OF CORRECTION

PATENT NO. : 6,279,834 B1 Page 1 of 1
DATED : August 28, 2001
INVENTOR(S) : Lindsey Faye Whitmore, Neale Harrison, Rodney Thomas Fox and John Farrell Hughes It is certified that error appears in the above-identified patent and that said Letters Patent is hereby corrected as shown below:

Title page,
Item [73], should read as follows:
-- [73] Assignee: University of Southampton, Southampton, (GB) and Reckitt Benckiser (UK) Limited, Slough, (GB) --

Signed and Sealed this

Twenty-fifth Day of June, 2002

*Attest:*

JAMES E. ROGAN

*Attesting Officer* *Director of the United States Patent and Trademark Office*